Patented Sept. 17, 1946

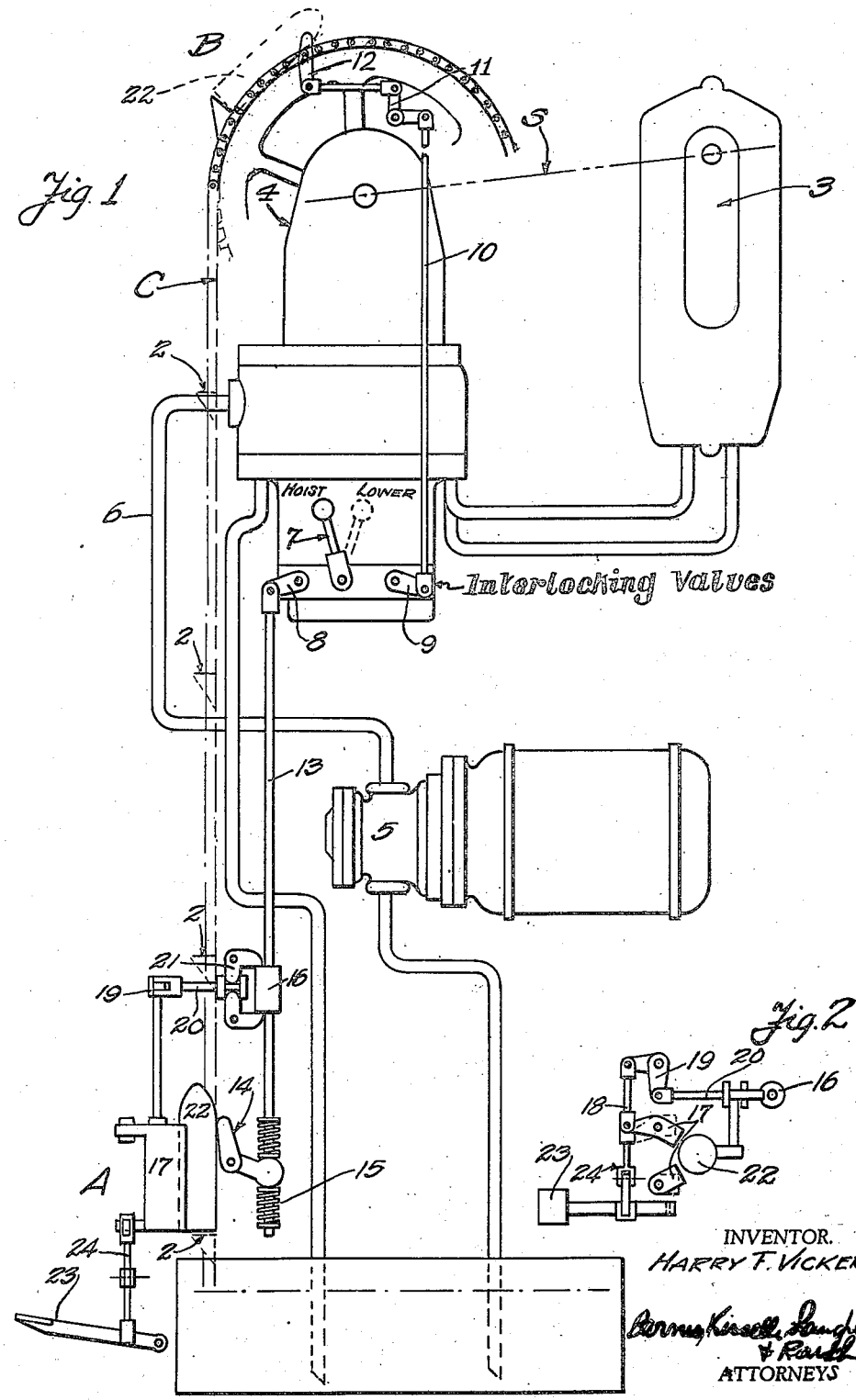

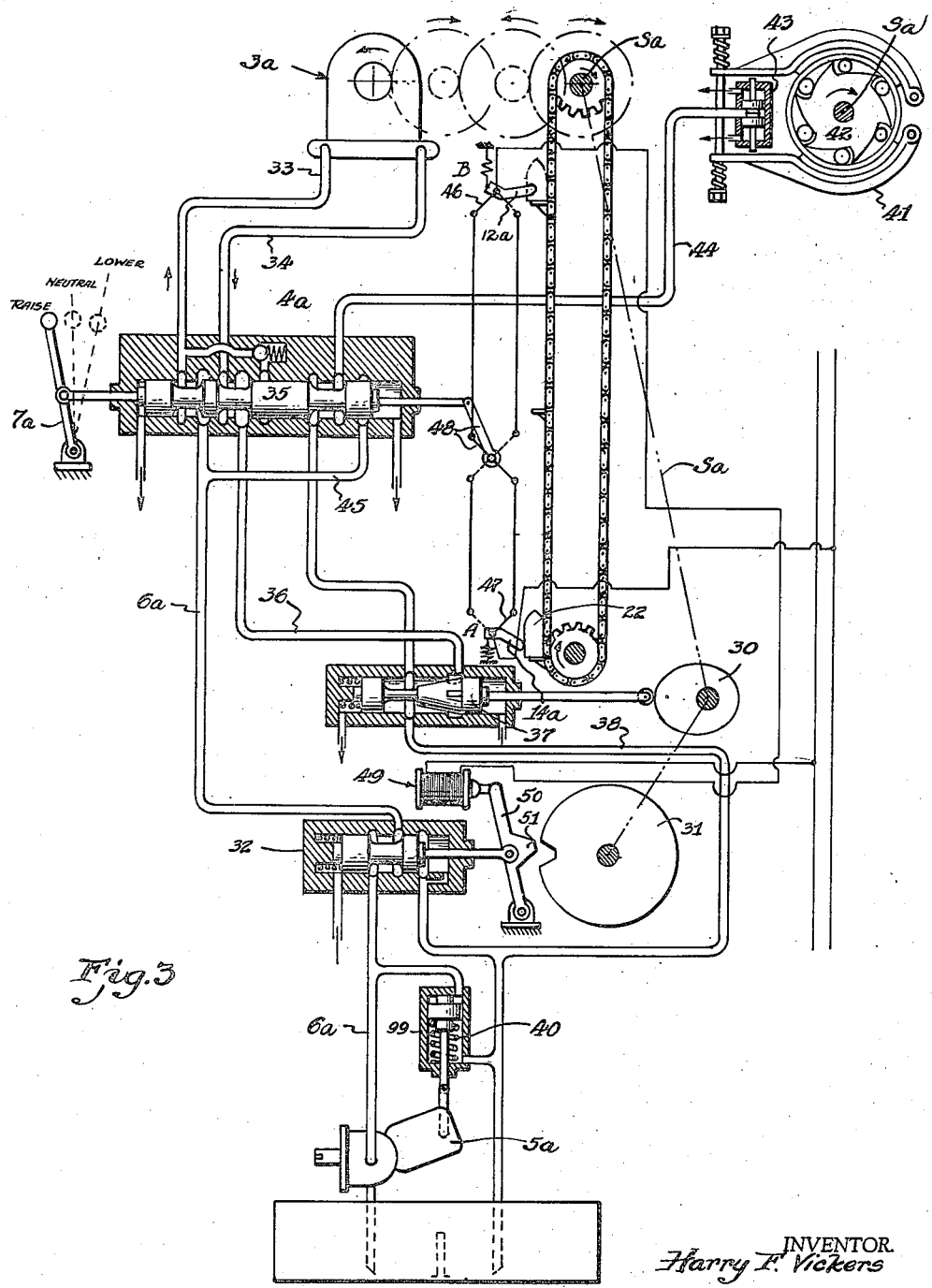

2,407,692

UNITED STATES PATENT OFFICE 2,407,692

SAFETY CONTROL FOR HOISTS

Harry F. Vickers, Washington, D. C., assignor, by mesne assignments, to Vickers, Incorporated, Detroit, Mich., a corporation of Michigan Application August 10, 1935, Serial No. 35,607

13 Claims. (Cl. 198—37)

This invention has to do with a safety control for hoists, and has to do particularly with a hoist of the type having a loading station and a delivery station and means for controlling the movement of the hoist in either direction between said stations.

The present invention relates to a chain hoist of the type having power to move a chain conveyor in either direction in successive steps and the main object of the invention resides in providing interlocking means in combination with means positioned and operated at the loading and delivery stations to control the actuation of the hoist. More specifically, the present invention relates to station control mechanism operating in combination with power actuating means whereby loading and delivery at remote stations is positively coordinated so that it is impossible to actuate the hoist unless conditions at the respective stations are in their predetermined arrangement; initial movement of articles from the loading station to the delivery station is thus controlled by the condition of either or both stations, the same being true of unloading from the delivery to the loading station and likewise in emptying from either.

Other features have to do with safety features associated with the loading station, the manner of associating the various controls to predetermine the movement of the hoist, and details of arrangement and construction as will be more clearly set forth in the specification and claims.

In the drawings:

Fig. 1 is an elevation, largely diagrammatic, of a conveyor type hoist and circuit therefor.

Fig. 2 is a plan view of the safety mechanism forming a part of the loading station A shown in Fig. 1.

Fig. 3 is a view similar to Fig. 1 but illustrating more in detail one form of hydraulic circuit that may be used in actuating and controlling the hoist unit and being modified from the disclosure shown in Fig. 1 in that electrical means are used to connect the loading and delivery stations with the control mechanism instead of direct mechanical means.

The primary elements to which this invention relates include a loading station A, a delivery station B, a chain type conveyor diagrammatically illustrated by the dash and dot lines C, step members 2 adapted to carry the articles being conveyed and an actuating shaft diagrammatically illustrated as at S. The conveyor C, which may be any kind of a continuous conveyor unit, is adapted to be actuated by the shaft S, one end of which is connected to hydraulic motor 3 and the other end to a control unit generally designated 4; in other words, the drive is usually from the motor 3 to the unit 4 and from the unit 4 through suitable reduction gearing to the conveyor C. The unit 4 also includes valve control and latch mechanism for controlling the step by step movement of the conveyor, the details of which do not need to be gone into for the purposes of this invention.

A pump 5 of the constant displacement type supplies liquid under pressure through the conduit 6 to the unit 4 and also to the motor 3. A lever 7, connected to a pilot valve, controls the supply of liquid to the motor 3 and also determines the direction of movement of the hoist. Levers 8 and 9 are connected to what might be termed interlocking valves (not shown) in that they are connected in series and must both be in a certain relative predetermined position before liquid under pressure can flow to the motor 3 to actuate the conveyor. As these interlocking levers 8 and 9 and corresponding valves control the actuation of the unit, it will be seen that these interlocking valves form a neutralizing means for the circuit, with the result that the lever 7 need only be moved to either hoisting or lowering position.

One of the interlocking valve levers 9 is directly connected as by means of a rod 10 with a bell crank 11 which in turn is connected to an article actuated control lever 12, this lever in Fig. 1 being shown in raised or "out" position; this "out" position being the position the lever 12 assumes when there is no article or package in the delivery station B. The other interlocking valve lever 8 is connected by means of a rod 13 with a loading station article actuated control lever 14, the connection between the rod 13 and the lever 14 being by means of springs 15.

A valve stop 16 is rigidly secured to the rod 13. The loading station A is guarded by means of safety wings 17 which wings are adapted to actuate laterally shiftable linkage 18, this linkage in turn being connected through a bell crank 19 with a rod 20, the in and out movement of which actuates the pivoted levers 21. The safety wings 17 must be opened before an article or package 22 may be inserted in the loading station and while these wings 17 are open as shown in dotted lines in Figure 2, or even only partially open, the lever 20 will be retracted to move the levers 21 to, or hold them in, neutral position, that position shown in Fig. 1. When the levers 21 are closed, they will hold the valve stop 16 in neutral position which will in turn hold the valve lever 8 in such a position that the hoist cannot be operated, regardless of the position of the cam 12 and the valve lever 9, thus even though the article 22 has been pushed all the way into the loading station against the lever 14, if the safety wings 17 are not closed the valve stop 16 will not be released. To take care of this relative movement, the springs 15 will be compressed by movement of the lever 14 so that the instant the levers 21 are released by the closing of the safety wings 17, the stop 16 and the rod 7 will automatically be moved downwardly to actuate the hoist, providing the lever 12 is in its proper position.

Connected to this same linkage 18, 19 and 20 is a foot control lever 23. In normal practice the safety wings 17 will be opened by pressing the lever 23 downwardly. Thus when the operator is pressing the lever 23 downwardly to load the station A it will be impossible for the hoisting mechanism to start. In the drawings, Figs. 1 and 2, the foot lever 23 is shown almost returned to normal position, but inasmuch as the safety wings 17 are not completely closed the linkage 18, 19 and 20 is still effective to hold the valve stop 16 in neutral position so there cannot possibly be any movement of the hoisting mechanism until the safety wings 17 and/or the lever 23 have been moved to normal closed position. A bell crank 24 serves as a connecting means between the lever 23 and the transverse linkage 18.

In operation, the lever 23 is depressed, the safety wings 17 opened and a package or other article 22 inserted in the loading station and above the carrying step 2, it being understood that the operator may have moved or stands ready to move the control lever 7 to the solid line hoist position as shown in Fig. 1; release of the foot lever 23 and return of the safety wings 17 to closed position will in turn release the lever 21 and allow the spring 15 to draw the lever 8 downwardly. Now if there already is a package or article in the delivery station B, the lever 21 will be moved "in" and the control lever 9 moved downwardly, with the result that the levers 8 and 9 will be in relative interlocked position and it will be impossible to actuate the hoist. Thus even though the loading operator at the station A desires to elevate a package or even if he has received a signal from the remote delivery station B, it will be impossible to actuate the hoist until the article at the delivery station B has been removed. This will prevent the article at the station B from being carried all around the conveyor and possibly damaged, or if it should be an explosive, such as a can of nitro-glycerin, it will prevent the same from being moved around to the other side of the conveyor or to any other undesired and dangerous position. However, if or when the article in station B has been removed the lever 12 will be moved to "out" position and the valve lever 9 moved to a position relative to the valve 8 which will permit liquid to flow through the circuit and allow the motor 3 to effect hoisting or movement of the conveyor C. The mechanism within the control unit 4 will be effective to automatically stop the conveyor when it has moved the required distance as determined by the distance between the steps 2. Any standard mechanism can be utilized for effecting this automatic stop and one possible structure will be described in connection with Fig. 3. Just what particular mechanism is utilized for effecting the stopping is unimportant to the present invention as the same is directed mainly to the combination between the loading stations and the interlocking controls. Movement of the article 22 from the loading station to the next position, as is indicated by the numeral 2 just above the lever 20 in Fig. 1, will now allow the operator to again place an article in the loading station. Again actuation of the hoisting circuit by the lever 7 will be impossible until the article 22 is removed from the point of delivery.

If it is desired to move the articles from the delivery station B to the loading station A, the article is placed in the loading station B as indicated in dotted lines at 22 in which case the lever 12 will be moved to its "in" position. The control handle 7 now being moved by the operator or having been previously moved to its dotted line or lowering position, the motor 3 will now cause the conveyor to move downwardly providing the article 22 has been removed from the loading station and also providing that the safety wings 17 and the foot control lever have been moved to normal position. However, if the article 22 is still pressing against the lever 14 or if the operator is pressing upon the foot lever 23 to hold the valve stop 16 in neutral position, it will be impossible to actuate the motor to lower the conveyor even though the lever is moved by the control operator. In other words, the charge 22 at the loading station must be removed and the safety wing 17 returned to closed position before the lowering circuit can be actuated by the lever 7 after the inward movement of the lever 12. Thus, in order to lower, the lower article actuated lever must be "out" and the upper lever "in." Any other combination will make the circuit inoperative.

If it is desired to empty the conveyor C in either direction, the lever 12 or 14 depressed depending upon which station the articles are emptied from and the handle 7 is moved to the desired operating position depending upon the direction in which emptying is desired. In other words, if the emptying is through the loading station A, the lever 12 will be manually depressed and the removal of the article from the loading station A will permit the lever 14 to move "out" and permit actuating the unit for one cycle or what may be termed one step; thus, even though the operator place some shim underneath the lever 12 to hold it depressed, the conveyor will merely actuate a cycle at a time, each time as the article is removed from the loading station A. The unloading of the conveyor from the other end will, of course, necessitate just the reversal of the above procedure.

It will thus be seen that I have provided a combination of station controls and interlocking valve controls to obtain the following safety combinations for actuation of the conveyor unit:

1. If any lever is in neutral, for instance such as the position of the lever 8 in Fig. 1, the conveyor unit is inoperative.
2. If the control handle 7 is in either position and both of the levers 12 and 14 pressed "in," the conveyor unit is inoperative.
3. Again, with the control handle 7 in either position and with both levers 12 and 14 "out," the conveyor unit is inoperative.
4. With the control handle 7 in hoist position and the upper lever 12 "out," depression of the lower lever 14 will cooperate with control to actuate the hoist.
5. With the control handle 7 in lowering position and with an article in the station B, an empty loading station, or removal of an article from the loading station and closing of the safety wing 17 will cooperate with the control to lower the conveyor unit one cycle.

6. To operate the conveyor in either direction, or for unloading, the valve control levers 8 and 9 must assume relative "open" positions (that is to permit free flow of working fluid) and in the arrangement shown, to operate in either direction the lever 12 must be "in" while the lever 14 is "out," or vice versa, the lever 14 must be "in" and the lever 12 "out."

In Fig. 3 I have shown an arrangement somewhat similar to Fig. 1 except that it has to do more particularly with details of one form of control unit. In this modification the connection between the loading stations A and B and the interlocking means is by means of an electrical solenoid circuit and electrical valves instead of direct mechanical connections and hydraulic valves. Here the conveyor motor may be designated 3a, the control unit 4a, the pump, which is a variable delivery pump instead of a constant displacement pump, 5a, and the directional control lever 7a. The conveyor shaft is generally designated as at 8a and mounted on the control shaft are cam members 30 and 31. The flow of liquid under pressure is from the variable displacement pump 5a through the conduit 6a, through an auxiliary control unit 32, through the main control unit 4a and then through the conduits 33 or 34 to the motor 3a. With the lever 7a in the position shown, the flow will be through the conduit 33, through the motor 3a and then in turn through the conduit 34 past the valve 35 through a conduit 36, past the accelerating valve 37 and into the tank return line 38.

The cam 30 being connected to the conveyor shaft, is so arranged that the valve 37 will be moved inwardly towards the end of each cycle. This will cause deceleration of the motor and conveyor as the same approaches stopping position in each cycle or acceleration as the same leaves stopping position in each cycle. Movement of the valve 37 towards the left, as shown in Fig. 3 to decelerate the stopping movement will result in an increase in pressure in the line 6a with the result that such pressure entering the control member 39 will lower the variable member of the pump 5a against the predetermined pressure spring 40 so as to shorten the stroke of the variable pump during this deceleration period. Movement of the cam past the point of stopping or starting and movement of the valve 37 to the right will result in the variable member of the pump 5a returning to full stroke position.

A safety unit comprising a combined free wheeling and pressure controlled brake members is generally designated 41 and includes a free wheeling device 42 acting as a safety member during raising of the conveyor and a pressure control unit 43 for normally spreading the brake shoes during lowering. It will be seen that when the lever 7a is in "raise" position, as shown in full lines in Fig. 3, the conduit 44 leading from the pressure member 43 is connected to the tank return conduit 38. However, when the piston 35 is moved all the way to the right to lowering position, then a branch 45 from the line 6a connects pressure to the unit 43 to maintain the brake members spread apart as long as the hoisting pressure is operative. In case of failure of power in either the circuit shown in Fig. 1 or in Fig. 3, it will be obvious that pressure will be removed from the motor to permit the conveyor to be moved by hand, providing, of course, that the station article actuated levers are in their proper position.

Instead of mechanical connections between the stations A and B in Fig. 3 and the control valves 32 and 35, I have provided electrical connecting and interlocking means. Article actuated members 12a and 14a may be provided similar to the levers 12 and 14, shown in Fig. 1, but in this case are connected to electrical valves or switches 46 and 47, respectively. A directional control switch 48 is positioned intermediate the two switches 46 and 47 and suitably connected up as shown in the wiring diagram in Fig. 3. The three switches 46, 47 and 48 form, when in proper position, a complete circuit between a suitable source of electrical supply and a solenoid 49. This solenoid, when excited, is effective to move the locking lever 50 from locking engagement with the cam 31. Now, it will be seen that with the directional control switch 48 in raising position, as shown in solid lines in Fig. 3, the lever 14a will have to be depressed and the lever 12a in its "out" position before the circuit will be completed through the solenoid 49. The minute that this circuit is completed, the lever 50 will be moved outwardly and fluid under pressure will flow through the conduit 5a through the valve 35 to actuate the motor 3a. After initial actuation of the conveyor shaft, the cam 31 will move to such a point that the surface 51 of the lever 50 will ride on the outer surface of the cam 31 before the article 22 will have moved far enough to permit the lever 14a to move to its "out" position. When the cam 31 will have made a complete cycle, the lever 50 will automatically move into the depression in the cam 31 to cut off the flow of pressure fluid and stop the conveyor. It will thus be seen that the loading, unloading, or emptying of the conveyor in the circuit shown in Fig. 3 is the same as in the circuit shown in Fig. 1 and that the stopping of the conveyor at the end of each cycle is independent of any actuation of the article actuated members at the loading or delivery stations.

What I claim is:

1. In a conveyor system of the type adapted to move articles from a loading station to a delivery station, a conveyor for moving the articles, power actuating means for the conveyor, means associated with said power actuating means for controlling the direction of movement thereof, spaced article sensitive means positioned adjacent said stations and operatively associated with said control means, and means operatively associated with said control means and said article sensitive means for normally effecting step by step movement of the power means and the conveyor dependent upon the respective loaded and unloaded condition of the article sensitive means and also operative to normally stop the conveyor at the end of each cycle.

2. In a fluid pressure hoist drive system for operating hoists, a rotary fluid pressure hoist motor, a valve for regulating the supply of pressure operating fluid to said hoist motor, means responsive to the loading and unloading of the hoist for causing the actuation of said valve in one direction to start said hoist motor, and means responsive to the operation of the hoist for causing the actuation of said valve in the reverse direction to stop said hoist motor.

3. In a fluid pressure system, the combination of a fluid pump, a fluid pressure motor, an article handling device driven by the motor, and means controlled in response to the imposition of a load on said device for initiating operation of the motor by the pump and means brought into operation by said initiating means to produce a predetermined rate of acceleration of the article handling device.

4. In a control system for a device for transferring articles from a loading station to an unloading station, the combination with the device and means for driving the device of a control circuit for controlling operation of the device, including circuit controlling means responsive to the positioning of an article in the device at the loading station, and circuit controlling means responsive to the transfer of an article to the unloading station for unloading, said circuit controlling means being arranged to render the control circuit effective to cause energization of the driving means only when an article is loaded on the device at the loading station and no article is present to unload from the device at the unloading station.

5. In a fluid pressure system, the combination of a fluid pump, a fluid pressure motor, an article handling device driven by the motor, means controlled in response to the imposition of a load on said device for initiating operation of the motor by the pump, means brought into operation by said initiating means to produce a predetermined rate of acceleration of the article handling device, and means brought into operation after a predetermined movement of the article handling device for producing a predetermined deceleration of the device.

6. In a fluid pressure system, the combination of a fluid pump, a fluid pressure motor, an article handling device driven by the motor, means controlled in response to the imposition of a load on said device for initiating operation of the motor by the pump, means brought into operation by said initiating means to produce a predetermined rate of acceleration of the article handling device, and means brought into operation after a predetermined movement of the article handling device for stopping operation of the motor by the pump.

7. In a control system for a device for transferring articles from a loading station to an unloading station, the combination with the device and means for driving the device of a control circuit for controlling operation of the device including circuit controlling means responsive to the positioning of an article in the device at the loading station, and circuit controlling means responsive to the transfer of an article to the unloading station for unloading, said circuit controlling means being arranged to render the control circuit effective to cause energization of the driving means only when an article is loaded on the device at the loading station and no article is present to unload from the device at the unloading station, means for reversing the operation of the driving means, and means for reversing the effect of the circuit controlling means to correspond to the reversed relation of the loading and unloading stations when the driving means is reversed.

8. In a control system for a device for transferring articles from a loading station to an unloading station, the combination with the device and means for driving the device of a control circuit for controlling operation of the device, including circuit controlling means responsive to the positioning of an article in the device at the loading station, and circuit controlling means responsive to the transfer of an article to the unloading station for unloading, said circuit controlling means being arranged to render the control circuit effective to cause energization of the driving means only when an article is loaded on the device at the loading station and no article is present to unload from the device at the unloading station, and means for manually operating one of said circuit controlling means.

9. In a control system for a device for transferring articles from a loading station to an unloading station, the combination with the device and means for driving the device of a control circuit for controlling operation of the device, including circuit controlling means responsive to the positioning of an article in the device at the loading station, and circuit controlling means responsive to the transfer of an article to the unloading station for unloading, said circuit controlling means being arranged to render the control circuit effective to cause energization of the driving means only when an article is loaded on the device at the loading station and no article is present to unload from the device at the unloading station, means for reversing the operation of the driving means, and means operated concurrently with said last means for reversing the response of one of said circuit controlling means.

10. A conveyor system for transferring articles from a loading station to an unloading station comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive conjointly to the loading of an article on the conveyor at the loading station and the unloading of an article from the conveyor at the unloading station to automatically start the driving means, and stopping means responsive to travel of the conveyor through the distance between adjacent flights to automatically stop the driving means independently of the starting means, whereby when the conveyor is once filled wtih articles between the stations, delivery is made automatically by a single advancing movement of the conveyor and directly responsive to the loading and unloading of articles on and off the conveyor.

11. A conveyor system for transferring articles from a loading station to an unloading station comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive conjointly to the loading of an article on the conveyor at the loading station and the unloading of an article from the conveyor at the unloading station to automatically start the driving means, stopping means responsive to travel of the conveyor through the distance between adjacent flights to automatically stop the driving means independently of the starting means, and additional control means operated by the starting means to impart a predetermined acceleration to the driving means and operated by the stopping means to impart a predetermined deceleration to the driving means, whereby when the conveyor is once filled with articles between the stations, delivery is made automatically by a single advancing movement of the conveyor and directly responsive to the loading and unloading of articles on and off the conveyor.

12. A conveyor system for transferring articles from a loading station to an unloading station comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive conjointly to the loading of an article on the conveyor at the loading station and the unloading of an article from the conveyor at the unloading station to automatically start the driving means, stopping means responsive to travel of the conveyor through the distance between adjacent flights to automatically stop the driving means independently of the starting means, whereby when the conveyor is once filled with articles between the stations, delivery is made automatically by a single advancing movement of the conveyor and directly responsive to the loading and unloading of articles on and off the conveyor, means for reversing the operation of the driving means to operate the conveyor in the opposite direction, and means for reversing the response of the starting means to correspond to the reversed relation of the loading and unloading stations during operation in said opposite direction.

13. In, combination, a fluid pressure hoist drive system and a hoist operated thereby having upper and lower loading stations and including an endless conveyor band, said system comprising a fluid motor for driving said hoist, a pressure fluid operating circuit having pump means for circulating pressure fluid therein, valve means in said circuit for blocking the flow of fluid to said motor, a motor for operating the blocking valve means, and pilot control means responsive to the loading conditions of said hoist at each of the stations for causing actuation of said blocking valve means by said second named motor to effect the supply of pressure fluid from said pump means to said fluid motor for operating the latter.

HARRY F. VICKERS.